US008414175B2

(12) United States Patent
Lin et al.

(10) Patent No.: US 8,414,175 B2
(45) Date of Patent: Apr. 9, 2013

(54) LIGHT SOURCE APPARATUS WITH A LIGHT GUIDE PLATE HAVING A LIGHTING UNITS DISPOSED ADJACENT TO TWO OPPOSING SIDES OFFSET WITH EACH OTHER

(75) Inventors: Sheng-Hung Lin, Hsin-Chu (TW); Jung-Min Hwang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 254 days.

(21) Appl. No.: 12/917,487

(22) Filed: Nov. 2, 2010

(65) Prior Publication Data

US 2011/0176329 A1    Jul. 21, 2011

(30) Foreign Application Priority Data

Jan. 15, 2010   (TW) .............................. 99101108 A

(51) Int. Cl.
*F21V 7/04*    (2006.01)
(52) U.S. Cl. ......... 362/613; 362/611; 362/628; 362/615
(58) Field of Classification Search .......... 362/608–609, 362/611–613, 615, 618–620, 624–626, 555, 362/628
See application file for complete search history.

(56) References Cited

U.S. PATENT DOCUMENTS

| 4,105,293 | A | 8/1978 | Aizenberg et al. | |
|---|---|---|---|---|
| 7,063,450 | B2 | 6/2006 | Ehara et al. | |
| 7,530,725 | B2 * | 5/2009 | Yue | 362/620 |
| 8,025,435 | B2 * | 9/2011 | Tatehata et al. | 362/616 |
| 2002/0093808 | A1 | 7/2002 | Egawa | |
| 2006/0181902 | A1 | 8/2006 | Tamura et al. | |
| 2008/0157009 | A1 | 7/2008 | Wittenberg et al. | |
| 2008/0285310 | A1 * | 11/2008 | Aylward et al. | 362/626 |
| 2009/0040787 | A1 | 2/2009 | Nagata et al. | |
| 2009/0109373 | A1 | 4/2009 | Taniguchi et al. | |

FOREIGN PATENT DOCUMENTS

| DE | 102006056150 | 5/2008 |
|---|---|---|
| EP | 1992869 | 11/2008 |
| EP | 2042899 | 4/2009 |
| JP | 6323110 | 11/1994 |

(Continued)

OTHER PUBLICATIONS

"Extended European Search Report of Europe Counterpart Application", issued on May 16, 2011, p.1-p.8, in which the listed references were cited.

(Continued)

*Primary Examiner* — Robert May
(74) *Attorney, Agent, or Firm* — Jianq Chyun IP Office

(57) ABSTRACT

A light source apparatus including a light guide plate, a first light emitting unit, and a second light emitting unit is provided. The light guide plate has a first surface, an opposite second surface, a first side surface, and an opposite second side surface. The first light emitting unit is disposed beside the first side surface for providing a first light beam. The second light emitting unit is disposed beside the second side surface for providing a second light beam. The first light emitting unit has a central line passing through a geometric center of the first light emitting unit and being perpendicular to the first side surface. The second light emitting unit has a central line passing through a geometric center of the second light emitting unit and being perpendicular to the second side surface. The central lines do not coincide with each other.

18 Claims, 5 Drawing Sheets

FOREIGN PATENT DOCUMENTS

| | | |
|---|---|---|
| JP | 2001-141527 | 5/2001 |
| JP | 2002-203413 | 7/2002 |
| JP | 2004-253318 | 9/2004 |
| JP | 2004-319162 | 11/2004 |
| JP | 2009-076349 | 4/2009 |
| TW | 200907440 | 2/2009 |
| TW | M354133 | 4/2009 |

OTHER PUBLICATIONS http://tw.ttnet.net/cshow_html.jsp/%6c%65%64%b6%ea%ab%ac%be%f2%b6%ea%ab%ac%ad%-49%a5%fa%aa%4f/ SS/cooklang/1/prdhtm/Y/cono/40002148/item_no/14/itno/LG120/dtno/010/type1/A, retrieved on Nov. 1, 2010 with English abstract.

"Office Action of Japan Counterpart Application", issued on Jul. 31, 2012, p.1-p.8, in which JP2004-253318 JP2002-203413, JP2001-141527, JP2004-319162, JP63023110, and JP2009-076349 were cited.

"Office Action of Taiwan counterpart application" issued on Aug. 24, 2012, p.1-p.13, in which US20080157009, TW200907440, and TWM354133 were cited.

"Office Action of Europe Counterpart Application", issued on Oct. 24, 2012, p.1-p.5, in which US20020093808 was cited.

* cited by examiner

LIGHT SOURCE APPARATUS WITH A LIGHT GUIDE PLATE HAVING A LIGHTING UNITS DISPOSED ADJACENT TO TWO OPPOSING SIDES OFFSET WITH EACH OTHER

CROSS-REFERENCE TO RELATED APPLICATION

This application claims the priority benefit of Taiwan application serial no. 99101108, filed on Jan. 15, 2010. The entirety of the above-mentioned patent application is hereby incorporated by reference herein and made a part of this specification.

BACKGROUND OF THE INVENTION

1. Field of the Invention

The invention relates to a light source apparatus, and more particularly, to a light source apparatus having a light guide plate.

2. Description of Related Art

Along with the advancement of illumination technologies, light sources adopted by illumination devices have gradually changed from incandescent lamps and fluorescent lamps to fast-developing light emitting diodes (LEDs). LED has such advantages as low power consumption, long lifespan, environment friendliness, fast start-up, and small volume, etc. Besides, the power of LED has been increasing along with the advancement of LED techniques. Thus, LED is one of the main promising candidates to replace conventional fluorescent lamps in residential and industrial applications.

Because LED is a kind of spot light source, the light emitted by a LED is focused and therefore may cause glare to human eyes. Thus, a side incident type light source apparatus with a flat light guide plate is developed. In the side incident type light source apparatus, LEDs are disposed at a side of the flat light guide plate, and the flat light guide plate guides the light emitted by the LEDs to the front of the flat light guide plate to produce a uniform surface light source.

A lighting installation based on a light guide is illustrated in FIGS. 5-7 in U.S. Pat. No. 4,105,293. The lighting installation includes a light guide plate having a round light emitting surface and a plurality of light sources surrounding the light guide plate. In addition, a backlight module is disclosed in FIG. 1 in U.S. Pat. No. 7,063,450, wherein a special light diffusing structure is formed at the light incident side of the light guide plate such that the light incident angle is enlarged and accordingly the light uniformity is increased. Moreover, a round or oval LED backlight source is disclosed in http://tw.ttnet.net/cshow_html.jsp/
%6c%65%64%b6%ea%ab%ac%-
be%f2%b6%ea%ab%ac%ad%49%a5%fa%aa%4f/SS/cook-lang/1/prdhtm/Y/cono/40002148/item_no/14/itno/LG120/dtno/010/type1/A, wherein the light guide plate is in a round or oval shape, and the light source emits light toward the center of the light guide plate.

SUMMARY OF THE INVENTION

Accordingly, the invention is directed to a light source apparatus with high light uniformity and light emitting efficiency.

Additional aspects and advantages of the invention will be set forth in part in following description.

In order to achieve at least one of aforementioned objects and other objects, according to an embodiment of the invention, a light source apparatus including a light guide plate, a first light emitting unit, and a second light emitting unit is provided. The light guide plate has a first surface, a second surface opposite to the first surface, a first side surface, and a second side surface opposite to the first side surface. The first light emitting unit is disposed beside the first side surface and capable of providing a first light beam, wherein the first light beam is capable of entering the light guide plate through the first side surface. The second light emitting unit is disposed beside the second side surface and capable of providing a second light beam, wherein the second light beam is capable of entering the light guide plate through the second side surface. The first light emitting unit has a central line passing through a geometric center of the first light emitting unit and being perpendicular to the first side surface. The second light emitting unit has a central line passing through a geometric center of the second light emitting unit and being perpendicular to the second side surface, and the central line of the first light emitting unit does not coincide with the central line of the second light emitting unit. According to an embodiment of the invention, the first side surface is substantially parallel to the second side surface.

According to an embodiment of the invention, the first side surface has a first midperpendicular, and the second side surface has a second midperpendicular, wherein the first midperpendicular and the second midperpendicular do not coincide with each other.

According to an embodiment of the invention, the central line of the first light emitting unit is substantially parallel to the central line of the second light emitting unit.

According to another embodiment of the invention, a light source apparatus including a light guide plate, a first light emitting unit, and a second light emitting unit is provided. The light guide plate has a first surface, a second surface opposite to the first surface, a first side surface, and a second side surface opposite to the first side surface. The first light emitting unit is disposed beside the first side surface and capable of providing a first light beam, wherein the first light beam is capable of entering the light guide plate through the first side surface. The second light emitting unit is disposed beside the second side surface and capable of providing a second light beam, wherein the second light beam is capable of entering the light guide plate through the second side surface. The first side surface has a first midperpendicular, and the second side surface has a second midperpendicular, wherein the first midperpendicular and the second midperpendicular do not coincide with each other. According to an embodiment of the invention, the first side surface is substantially parallel to the second side surface.

According to an embodiment of the invention, a width of the first side surface in the direction parallel to the first surface is defined as A, a width of the first light emitting unit in the direction parallel to the first surface is defined as B, and B/A is greater than or equal to 45% and smaller than or equal to 60%.

According to an embodiment of the invention, a width of the first side surface in the direction parallel to the first surface is defined as A, a perpendicular distance between the first side surface and the second side surface is defined as C, and A/C is greater than or equal to 50% and smaller than or equal to 75%.

According to an embodiment of the invention, a width of the first side surface in the direction parallel to the first surface is defined as A, a width of the overlap between the orthographic projection of the second side surface on the first side surface and the first side surface in the direction parallel to the first surface is defined as D, and D/A is greater than or equal to 65% and smaller than or equal to 90%.

According to an embodiment of the invention, the light source apparatus further includes a plurality of scattering microstructures disposed on at least one of the first surface and the second surface. The number density of the scattering microstructures gradually increases from two ends of the light guide plate close to the first side surface and the second side surface toward the central portion of the light guide plate away from the first side surface and the second side surface.

According to an embodiment of the invention, the light source apparatus further includes a reflection unit disposed on the second surface.

According to an embodiment of the invention, the light source apparatus further includes two reflection units respectively disposed on a portion of the first side surface and a portion of the second side surface, and the two reflection units are respectively disposed beside the first light emitting unit and the second light emitting unit.

According to an embodiment of the invention, the light source apparatus further includes a third side surface and a fourth side surface opposite to the third side surface. The third side surface connects the first side surface and the second side surface, the fourth side surface connects the first side surface and the second side surface, wherein each of the third side surface and the fourth side surface is a curved surface.

In summary, the embodiment or the embodiments of the invention may have at least one of the following advantages. In the light source apparatus of the embodiment of the invention, a light guide plate is adopted for guiding the light, and the first light emitting unit and the second light emitting unit are respectively disposed at sides of the light guide plate, wherein the central line of the first light emitting unit and the central line of the second light emitting unit do not coincide with each other so that the first light emitting unit and the second light emitting unit do not face each other directly, and accordingly the light uniformity and light emitting efficiency of the light source apparatus are improved. In addition, the first midperpendicular of the first side surface and the second midperpendicular of the second side surface do not coincide with each other, so that the light uniformity and light emitting efficiency of the light source apparatus are further improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
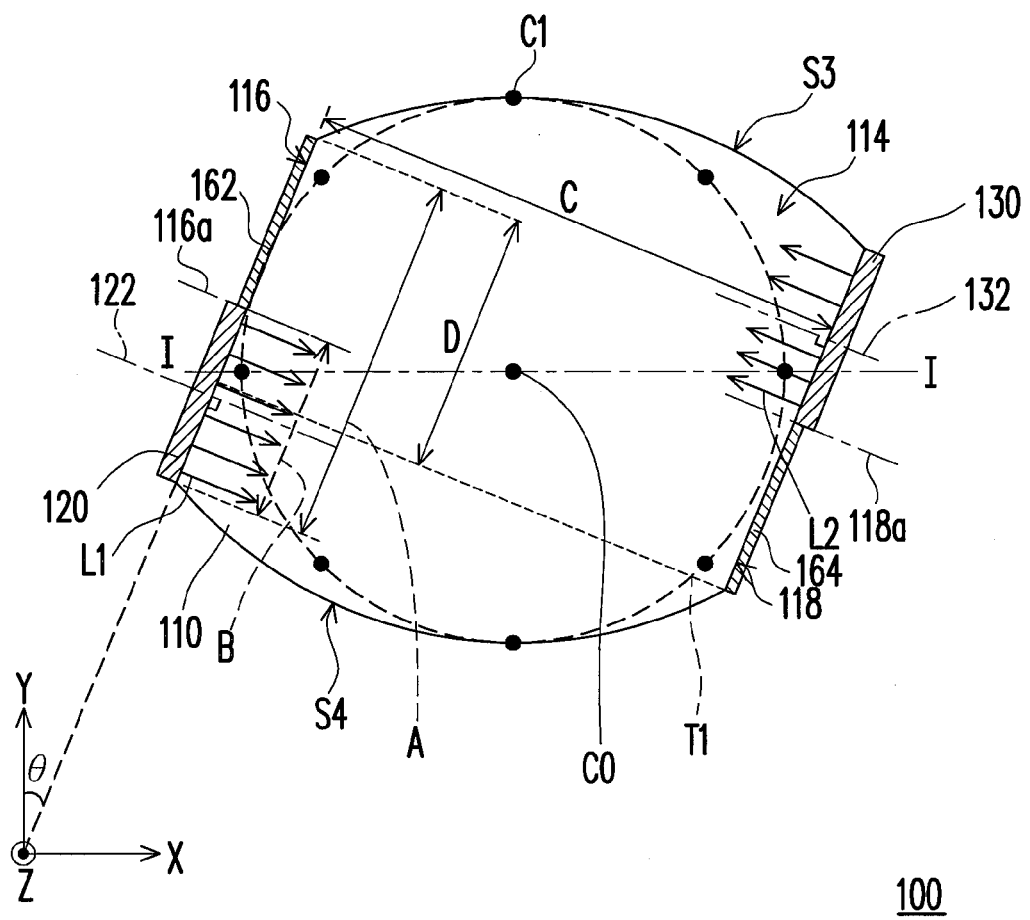
FIG. 1 is a top view of a light source apparatus according to an embodiment of the invention.
Figure 2:
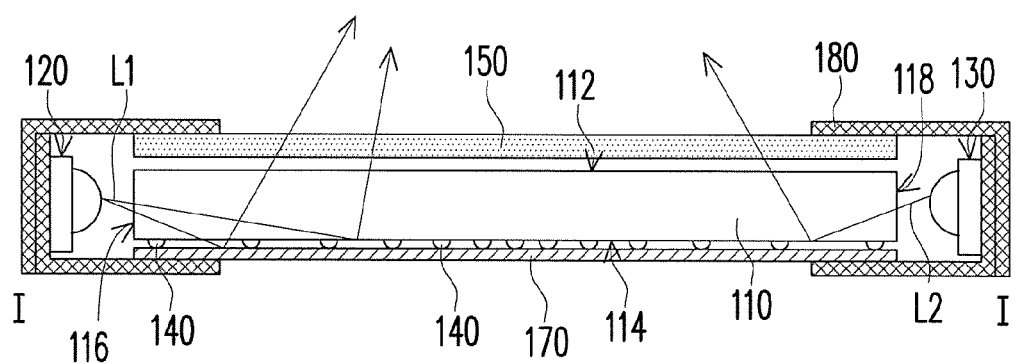
FIG. 2 is a cross-sectional view of the light source apparatus in FIG. 1 along line I-I.

Referring to both FIG. 1 and FIG. 2, in the embodiment, the light source apparatus 100 includes a light guide plate 110, a first light emitting unit 120, and a second light emitting unit 130. The light guide plate 110 has a first surface 112, a second surface 114 opposite to the first surface 112, a first side surface 116, and a second side surface 118 opposite to the first side surface 116. In the embodiment, the first side surface 116 and the second side surface 118 may be two planes parallel to each other. Besides, the light guide plate 110 may further include a third side surface S3 and a fourth side surface S4 opposite to the third side surface S3, as shown in FIG. 1. The third side surface S3 connects the first side surface 116 and the second side surface 118, the fourth side surface S4 connects the first side surface 116 and the second side surface 118, and each of the third side surface S3 and the fourth side surface S4 is a curved surface.

For example, when the light guide plate 110 is in a cylinder shape, the third side surface S3 and the fourth side surface S4 are respectively a cylindrical curved surface, and when the light guide plate 110 is in an elliptic cylinder shape, the third side surface S3 and the fourth side surface S4 are respectively a elliptical cylindrical curved surface. However, the invention is not limited to foregoing examples, and in an embodiment, the third side surface S3 and the fourth side surface S4 may be different from each other, or the third side surface S3 and the fourth side surface S4 may also be other different curved surfaces.

In the embodiment, the light guide plate 110 is an elliptical cylindrical light guide plate. The first side surface 116 and the second side surface 118 (as illustrated in FIG. 1) of the light guide plate 110 may be formed by cutting the light guide plate 110 along a shorter "sides" of the ellipse at an angle θ. In other words, the cutting direction of the first side surface 116 and the second side surface 118 forms the angle θ with the YZ plane, as shown in FIG. 1.

The first light emitting unit 120 is disposed beside the first side surface 116 and capable of providing a first light beam L1, and the second light emitting unit 130 is disposed beside the second side surface 118 and capable of providing a second light beam L2, wherein the first light beam L1 enters the light guide plate 110 through the first side surface 116, and the second light beam L2 enters the light guide plate 110 through the second side surface 118, as shown in FIG. 1 and FIG. 2. Because the first light emitting unit 120 and the second light emitting unit 130 are respectively disposed beside the first side surface 116 and the second side surface 118, the first side surface 116 and the second side surface 118 are light incident surfaces of the light guide plate 110. In the embodiment, the first light beam L1 and the second light beam L2 transmitted within the light guide plate 110 are transmitted out of the light guide plate 110 through the first surface 112. Thus, the first surface 112 is the light emitting surface of the light guide plate 110.

In the embodiment, the first light emitting unit 120 and the second light emitting unit 130 are each a light emitting diode (LED) light bar, for example, wherein each LED light bar is composed of a plurality of LEDs disposed on a board. In other embodiments, the first light emitting unit 120 and the second light emitting unit 130 may also be fluorescent lamps or other suitable light emitting devices.

The first light emitting unit 120 has a central line 122 passing through a geometric center of the first light emitting unit 120 and being perpendicular to the first side surface 118, and the second light emitting unit 130 has a central line 132 passing through a geometric center of the second light emitting unit 130 and being perpendicular to the second side surface 118. In the embodiment, because each of the first side surface 116 and the second side surface 118 respectively forms an angle θ with the YZ plane and the first light emitting unit 120 and the second light emitting unit 130 do not face each other directly, the central line 122 of the first light emitting unit 120 disposed beside the first side surface 116 does not coincide with the central line 132 of the second light emitting unit 130 disposed beside the second side surface 118, as shown in FIG. 1. In addition, if the first side surface 116 and the second side surface 118 are planes parallel to each other, the central line 122 of the first light emitting unit 120 and the central line 132 of the second light emitting unit 130 are substantially parallel to but do not coincide with each other.

Below, the light guide plate 110 will be described as an elliptical cylindrical light guide plate. However, the invention is not limited thereto. Because the first side surface 116 and the second side surface 118 are formed by cutting the light guide plate 110 at an angle θ with respect to the YZ plane and are substantially parallel to each other, a first midperpendicular 116a of the first side surface 116 does not coincide with a second midperpendicular 118a of the second side surface 118. Similarly, because the first side surface 116 and the second side surface 118 are parallel to each other, the first midperpendicular 116a of the first side surface 116 and the second midperpendicular 118a of the second side surface 118 are substantially parallel to but do not coincide with each other.

In addition, because the first side surface 116 and the second side surface 118 are formed on the light guide plate 110 (as illustrated in FIG. 1) by cutting the light guide plate 110 at an angle θ with respect to the YZ plane, the light guide plate 110 formed with different value of the angle θ causes the light source apparatus 100 to present different optical effect, such as the light uniformity or the light emitting efficiency of the light source apparatus 100. This fact will be described below.

Figure 3:
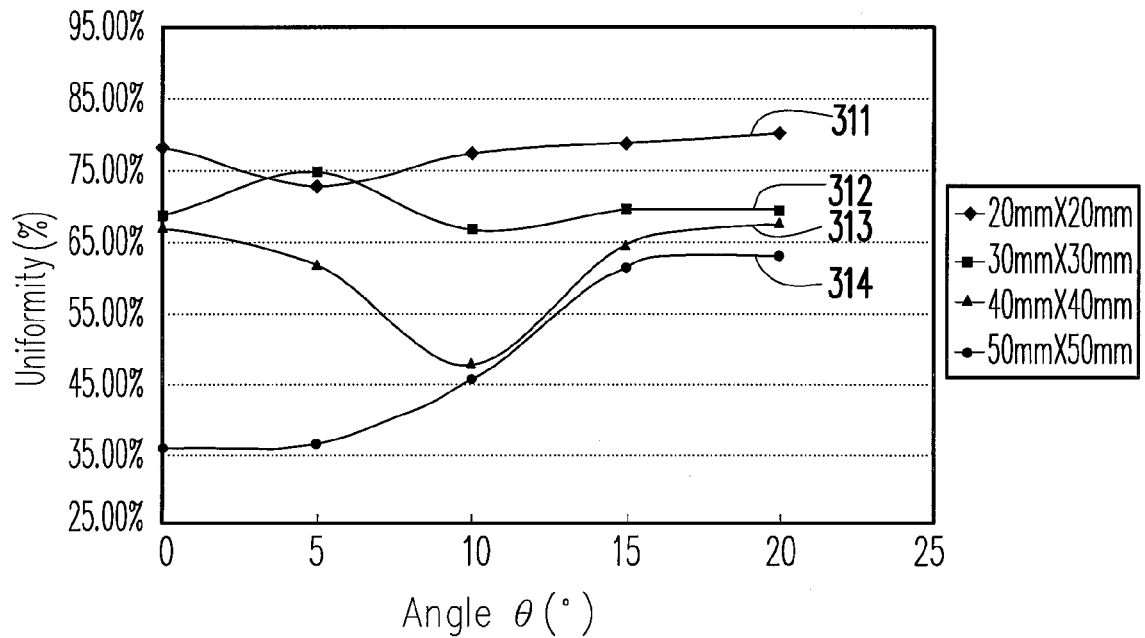
FIG. 3 is a diagram illustrating the light uniformities presented by the light source apparatus in FIG. 1 when a first side surface and a second side surface of the light source apparatus form different angles with the YZ plane.

FIG. 3 is a diagram illustrating the light uniformities presented by the light source apparatus in FIG. 1 when the first side surface 116 and the second side surface 118 in the light source apparatus form different angle θ with the YZ plane, wherein different curves present different light emitting range, and the value of the angle θ is respectively assumed to be 5°, 10°, 15°, and 20°. In the embodiment, to measure the light uniformity of the light source apparatus 100, a visible region T1 is first defined with a center point C0 of the light guide plate 110 as a center. In the embodiment, the visible region T1 is in a round shape, as shown in FIG. 1. Then, 8 points C1 with equal distances in between are defined at the edge of the visible region T1. Next, when the first light emitting unit 120 and the second light emitting unit 130 respectively provide the first light beam L1 and the second light beam L2 entering the light guide plate 110, the light intensities at the points C0 and C1 within the visible region T1 are respectively measured, and the light uniformity within the visible region T1 is defined by dividing the smallest light intensities at the points C0 and C1 by the greatest light intensities at the points C0 and C1.

Referring to FIG. 3, the curves 311-314 respectively represent the light uniformity within the visible region T1 having a size of 20 mm×20 mm, 30 mm×30 mm, 40 mm×40 mm, and 50 mm×50 mm on the light guide plate 110. As shown in FIG. 3, the greater the angle θ is (i.e., the greater the angle θ of the first side surface 116 and the second side surface 118 with respect to the YZ plane), the less different the light uniformities within the visible region T1 having the size of 20 mm×20 mm, 30 mm×30 mm, 40 mm×40 mm, and 50 mm×50 mm are. Namely, the greater the angle θ of the first side surface 116 and the second side surface 118 with respect to the YZ plane is, the higher light uniformity the light source apparatus 100 has. Notably, the value of the angle θ is not unlimited, and the value of the angle θ should be determined according to the size of the visible region T1. For example, the greater the angle θ is, the smaller the visible region T1 is. In the embodiment, the light source apparatus 100 presents a good optical quality (for example, a high light uniformity or light emitting efficiency) when the angle θ is greater than or equal to 15° and smaller than or equal to 20°.

To be specific, a width of the first side surface 116 in the direction parallel to the first surface 112 is defined as A. A width of the first light emitting unit 120 in the direction parallel to the first surface 112 is defined as B. A perpendicular distance between the first side surface 116 and the second side surface 118 is defined as C. A width of the overlap between the orthographic projection of the second side surface 118 on the first side surface 116 and the first side surface 116 in the direction parallel to the first surface 112 is defined as D. Thus, when the angle θ falls within 15°-20°, structure parameters of the light source apparatus 100 fall within following ranges. For example, B/A is about greater than or equal to 45% and smaller than or equal to 60% corresponding to the angle θ, A/C is about greater than or equal to 50% and smaller than or equal to 75% corresponding to the angle θ, and D/A is about greater than or equal to 65% and smaller than or equal to 90%. To be more specific, when the angle θ is about 15°, B/A is about 55.8%, A/C is about 57%, D/A is about 70%. When the angle θ is about 20°, B/A is about 50.5%, A/C is about 70.7%, and D/A is about 82%.

Figure 4:
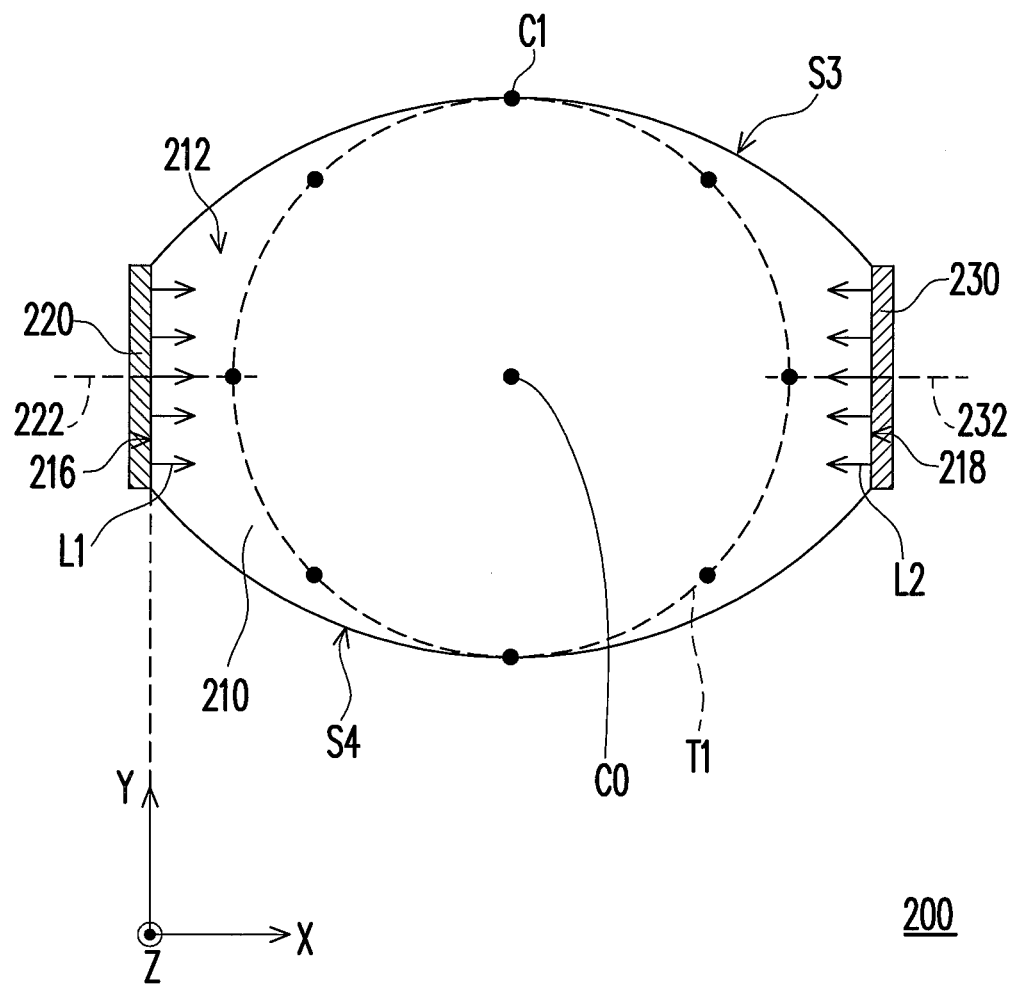
FIG. 4 is a top view of a light source apparatus with a first side surface and a second side surface parallel to the YZ plane.

In addition, a light source apparatus 200 as illustrated in FIG. 4 is presented when the angle θ is 0°. In the light source apparatus 200, because the angle θ is 0°, both the first side surface 216 and the second side surface 218 of the light guide plate 210 are parallel to the YZ plane (i.e., the angle θ formed by the first side surface 216 and the second side surface 218 with respect to the YZ plane is 0°). Accordingly, the first light emitting unit 220 disposed beside the first side surface 216 and the second light emitting unit 230 disposed beside the second side surface 218 face each other directly. Namely, the central line 222 of the first light emitting unit 220 and the central line 232 of the second light emitting unit 230 are substantially parallel to and coincide with each other, as shown in FIG. 4.

Similarly, if the light uniformity of the light source apparatus 200 having the angle θ as 0° (as shown in FIG. 4) is measured as described above, the light uniformities presented by the light source apparatus 200 with different sizes of the visible region T1 (20 mm×20 mm, 30 mm×30 mm, 40 mm×40 mm, and 50 mm×50 mm) are very different. Namely, the light uniformity presented by the light source apparatus 200 is not as good as the light uniformity presented by the light source apparatus 100 in the embodiment when the angle θ formed by the first side surface 216 and the second side surface 218 with respect to the YZ plane is 0°.

Figure 5:
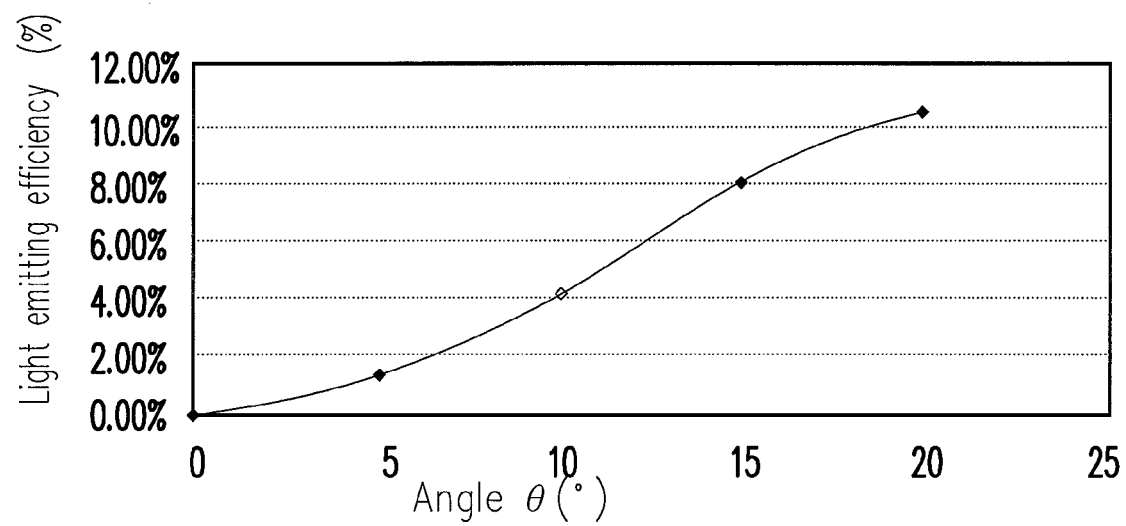
FIG. 5 is a graph illustrating the light emitting efficiency presented by a light source apparatus when a first side surface and a second side surface in the light source apparatus form different angels with the YZ plane.

Additionally, as shown in FIG. 5, in the embodiment, the light emitting efficiency of the light source apparatus 100 of the embodiment increases along with the angle θ formed by the first side surface 116 and the second side surface 118 with respect to the YZ plane based on the light emitting efficiency of the light source apparatus 200 in FIG. 4. It may be understood from FIG. 5 that the light emitting efficiency of the light source apparatus 100 increases along with the angle θ formed by the first side surface 116 and the second side surface 118 with respect to the YZ plane.

Moreover, referring to FIG. 1 and FIG. 2, the light source apparatus 100 further includes a plurality of scattering microstructures 140 (as shown in FIG. 2). In the embodiment, the scattering microstructures 140 may be disposed on at least one of the first surface 112 and the second surface 114. In the embodiment, the scattering microstructures 140 are disposed on the second surface 114. However, the invention is not limited thereto. Besides, in order to further improve the light uniformity or light emitting efficiency of the light source apparatus 100, a number density of the scattering microstructures 140 gradually increases from two ends of the light guide plate 110 close to the first side surface 116 and the second side surface 118 toward the central portion of the light guide plate 110 away from the first side surface 116 and the second side surface 118, as shown in FIG. 2. In the embodiment, the scattering microstructures 140 may be disposed for destroying the total internal reflection of the first light beam L1 and the second light beam L2 within the light guide plate 110.

Besides, a reflection unit 170 may be disposed at one side of the second surface 114 such that part of the first light beam L1 or the second light beam L2 is scattered by the scattering microstructures 140 and accordingly radiated toward the reflection unit 170. The reflection unit 170 reflects the first light beam L1 or the second light beam L2 so that the first light beam L1 or the second light beam L2 sequentially passes through the second surface 114 and the first surface 112 and emerges out of the light guide plate 110. Besides, another part of the first light beam L1 or the second light beam L2 is reflected by the scattering microstructures 140 and accordingly radiated toward the first surface 112 and emerges out of the light guide plate 110 through the first surface 112. In the embodiment, the scattering microstructures 140 may be bumps. However, in other embodiments, the scattering microstructures 140 may also be scattering materials, pits, raised patterns, or dimpled patterns. In the embodiment, the reflection unit 170 may be a reflector.

The light source apparatus 100 further includes two reflection units 162 and 164, as shown in FIG. 1 and FIG. 2. In the embodiment, the reflection units 162 and 164 are respectively disposed on a portion of the first side surface 116 and a portion of the second side surface 118 and are respectively located beside the first light emitting unit 120 and the second light emitting unit 130. Accordingly, when the first light beam L1 and the second light beam L2 respectively reach the second side surface 118 and the first side surface 116, the first light beam L1 and the second light beam L2 are reflected by the reflection units 162 and 164 so that less of the first light beam L1 and the second light beam L2 emerges out of the light guide plate 110 through the first side surface 116 and the second side surface 118 or absorbed by the opposite first light emitting unit 120 and second light emitting unit 130. In other words, the light source apparatus 100 disposed with the reflection units 162 and 164 has better light utilization efficiency and optical performance. In the embodiment, the reflection units 162 and 164 may be reflective sheets or coatings.

In the embodiment, in order to further improve the light uniformity of the light source apparatus 100, an optical film 150 may be further disposed on the first surface 112, as shown in FIG. 2. In the embodiment, the optical film 150 may be an optical diffuser.

Additionally, the light source apparatus 100 may further include a top cover 180. The top cover 180 is capable of fixing the light guide plate 110, the first light emitting unit 120, the second light emitting unit 130, the reflection unit 170, and the optical film 150 and exposing the visible region T1. To be specific, because the light guide plate 110 in the embodiment adopts such a design as illustrated in FIG. 1, it may be observed from the curve in FIG. 3 corresponding to the size of the visible region T1 as 50 mm×50 mm that the light source apparatus 100 still has a good light uniformity even when the visible region T1 has a large size and the angle θ falls between 15° and 20°. Namely, by adopting the structure illustrated in FIG. 1, the light source apparatus 100 offers a high light uniformity when the visible region T1 becomes larger. Thereby, the light emitting surface and light utilization efficiency of the light source apparatus 100 are both increased.

In summary, the embodiment or the embodiments of the invention may have at least one of the following advantages. The light source apparatus adopts a light guide plate for guiding the light, and the first light emitting unit and the second light emitting unit are respectively disposed at sides of the light guide plate, wherein the central line of the first light emitting unit and the central line of the second light emitting unit do not coincide with each other so that the first light emitting unit and the second light emitting unit do not face each other directly, and accordingly the light uniformity and light emitting efficiency of the light source apparatus are improved. In addition, the first midperpendicular of the first side surface and the second midperpendicular of the second side surface do not coincide with each other so that the light uniformity and light emitting efficiency of the light source apparatus are further improved.

Moreover, because an optical film is disposed at one side of the first surface, the brightness and uniformity of the light emitting surface are well controlled. Furthermore, in embodiments of the invention, because the scattering microstructures are disposed in the light source apparatus, the light emitting efficiency of the light source apparatus is further improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light source apparatus, comprising:
a light guide plate, having a first surface, a second surface opposite to the first surface, a first side surface, and a second side surface opposite to the first side surface;
a first light emitting unit, disposed beside the first side surface, capable of providing a first light beam, wherein the first light beam is capable of entering the light guide plate through the first side surface; and
a second light emitting unit, disposed beside the second side surface, capable of providing a second light beam, wherein the second light beam is capable of entering the light guide plate through the second side surface,
wherein the first light emitting unit has a central line passing through a geometric center of the first light emitting unit and being perpendicular to the first side surface, the second light emitting unit has a central line passing through a geometric center of the second light emitting unit and being perpendicular to the second side surface, and the central line of the first light emitting unit does not coincide with the central line of the second light emitting unit, wherein a width of the first side surface in a direction parallel to the first surface is defined as A, a width of an overlap between an orthographic projection of the second side surface on the first side surface and the first side surface in the direction parallel to the first surface is defined as D, and D/A is greater than or equal to 65% and smaller than or equal to 90%.

2. The light source apparatus according to claim 1, wherein the first side surface has a first midpemendicular, the second side surface has a second midperpendicular, and the first midperpendicular does not coincide with the second midperpendicular.

3. The light source apparatus according to claim 1, wherein the central line of the first light emitting unit is substantially parallel to the central line of the second light emitting unit.

4. The light source apparatus according to claim 1, wherein a width of the first light emitting unit in the direction parallel to the first surface is defined as B, and B/A is greater than or equal to 45% and smaller than or equal to 60%.

5. The light source apparatus according to claim 1, wherein a perpendicular distance between the first side surface and the second side surface is defined as C, and A/C is greater than or equal to 50% and smaller than or equal to 75%.

6. The light source apparatus according to claim 1 further comprising a plurality of scattering microstructures disposed on at least one of the first surface and the second surface, wherein a number density of the scattering microstructures gradually increases from two ends of the light guide plate close to the first side surface and the second side surface toward a central portion of the light guide plate away from the first side surface and the second side surface.

7. The light source apparatus according to claim 1 further comprising a reflection unit disposed on the second surface.

8. The light source apparatus according to claim 1 further comprising two reflection units respectively disposed on a portion of the first side surface and a portion of the second side surface, wherein the two reflection units are respectively disposed beside the first light emitting unit and the second light emitting unit.

9. The light source apparatus according to claim 1, wherein the first side surface is substantially parallel to the second side surface.

10. The light source apparatus according to claim 1 further comprising a third side surface and a fourth side surface opposite to the third side surface, wherein the third side surface connects the first side surface and the second side surface, the fourth side surface connects the first side surface and the second side surface, and each of the third side surface and the fourth side surface is a curved surface.

11. A light source apparatus, comprising:
a light guide plate, having a first surface, a second surface opposite to the first surface, a first side surface, and a second side surface opposite to the first side surface;
a first light emitting unit, disposed beside the first side surface, capable of providing a first light beam, wherein the first light beam is capable of entering the light guide plate through the first side surface; and
a second light emitting unit, disposed beside the second side surface, capable of providing a second light beam, wherein the second light beam is capable of entering the light guide plate through the second side surface,
wherein the first side surface has a first midperpendicular, the second side surface has a second midperpendicular, and the first midperpendicular does not coincide with the second midperpendicular, wherein a width of the first side surface in a direction parallel to the first surface is defined as A, a width of an overlap between a projection of the second side surface on the first side surface and the first side surface in the direction parallel to the first surface is defined as D, and D/A is greater than or equal to 65% and smaller than or equal to 90%.

12. The light source apparatus according to claim 11, wherein a width of the first light emitting unit in the direction parallel to the first surface is defined as B, and B/A is greater than or equal to 45% and smaller than or equal to 60%.

13. The light source apparatus according to claim 11, wherein a perpendicular distance between the first side surface and the second side surface is defined as C, and A/C is greater than or equal to 50% and smaller than or equal to 75%.

14. The light source apparatus according to claim 11 further comprising a plurality of scattering microstructures disposed on at least one of the first surface and the second surface, wherein a number density of the scattering microstructures gradually increases from two ends of the light guide plate close to the first side surface and the second side surface toward a central portion of the light guide plate away from the first side surface and the second side surface.

15. The light source apparatus according to claim 11 further comprising a reflection unit disposed on the second surface.

16. The light source apparatus according to claim 11 further comprising two reflection units respectively disposed on a portion of the first side surface and a portion of the second side surface, wherein the two reflection units are respectively disposed beside the first light emitting unit and the second light emitting unit.

17. The light source apparatus according to claim 11, wherein the first side surface is substantially parallel to the second side surface.

18. The light source apparatus according to claim 11 further comprising a third side surface and a fourth side surface opposite to the third side surface, wherein the third side surface connects the first side surface and the second side surface, the fourth side surface connects the first side surface and the second side surface, and each of the third side surface and the fourth side surface is a curved surface.

* * * * *